United States Patent
Buchtel

Patent Number: 5,901,745
Date of Patent: May 11, 1999

[54] MULTI-SOLUTION DISPENSING VALVE

[75] Inventor: Dean H. Buchtel, Canton, Ohio

[73] Assignee: The Hoover Company, North Canton, Ohio

[21] Appl. No.: 08/878,570

[22] Filed: Jun. 19, 1997

[51] Int. Cl.⁶ ................................. F16K 11/16
[52] U.S. Cl. .................. 137/595; 251/7; 137/630.22
[58] Field of Search ................. 137/630.19, 595, 137/630.22; 251/7, 9, 243, 4

[56] References Cited

U.S. PATENT DOCUMENTS

| | | |
|---|---|---|
| 1,038,960 | 9/1912 | Rhone . |
| 1,292,464 | 1/1919 | Henrikson et al. . |
| 1,789,013 | 1/1931 | McBrien . |
| 2,240,791 | 5/1941 | Leeseberg ............. 137/630.19 |
| 2,371,970 | 3/1945 | Marra . |
| 2,775,259 | 12/1956 | Stiebel . |
| 3,335,753 | 8/1967 | Kiser . |
| 3,411,534 | 11/1968 | Rose ....................... 251/9 |
| 3,498,316 | 3/1970 | Pinder et al. . |
| 3,575,161 | 4/1971 | London . |
| 3,578,885 | 5/1971 | Alton ....................... 251/7 |
| 3,606,091 | 9/1971 | Grisham . |
| 3,738,388 | 6/1973 | Parker et al. . |
| 3,897,524 | 7/1975 | Freismuth et al. . |
| 3,918,490 | 11/1975 | Goda ....................... 251/9 |
| 4,129,231 | 12/1978 | Larson ....................... 251/9 |
| 4,425,113 | 1/1984 | Bilstad ....................... 251/9 |
| 4,425,116 | 1/1984 | Bilstad ....................... 251/7 |
| 4,457,339 | 7/1984 | Juan et al. . |
| 4,546,794 | 10/1985 | Ball . |
| 4,575,007 | 3/1986 | Groth et al. . |
| 4,878,646 | 11/1989 | Edelman ....................... 251/9 |
| 4,932,629 | 6/1990 | Rodomista ....................... 251/7 |
| 4,969,486 | 11/1990 | Puzio ....................... 251/7 |
| 5,117,870 | 6/1992 | Goodale et al. . |
| 5,215,251 | 6/1993 | Volk, Jr. et al. . |
| 5,409,194 | 4/1995 | Blanc ....................... 251/9 |

FOREIGN PATENT DOCUMENTS

WO 81/02980 10/1981 WIPO .

Primary Examiner—John Rivell
Assistant Examiner—Ramyar Farid
Attorney, Agent, or Firm—A. Burgess Lowe; Bruce P. Watson

[57] ABSTRACT

A dispensing valve arrangement is provided which includes a series of pinch valves and their respective deformable hoses. A pair of actuating mechanisms is provided so that some of the pinch valves first move to full flow position before other pinch valves move towards opened position to provide sequential operation and an additional feed which confluently merges and mixes with the feed from the first valves.

14 Claims, 5 Drawing Sheets

MULTI-SOLUTION DISPENSING VALVE

BACKGROUND OF THE INVENTION

1. Field of the Invention

The invention relates to a dispensing valve arrangement and, more particularly, to a multi-solution dispensing valve arrangement that might be utilized in an extractor or the like.

2. Description of the Prior Related Art

Although pinch valves are old and well known for the dispensing of fluids and some are even arranged in parallel to provide a solution comprising a mixture of fluids and some are even arranged to be operatively connected so as to alter the flow of some of the pinch valve feeds as others are opened, while at the same time altering the total flow, no pinch valve arrangement is known which permits the intermixture of at least two feeds with the selective intermixture of at least a third feed.

A valving arrangement having these structural and functional characteristics could find great utility in the dispensing art. For example, such an arrangement, could yield many operating advantages if utilized in an extractor. The initial two feeds could be water and detergent giving a washing solution flow of sufficient strength to clean all but the most stubborn spots on a floor covering. A third feed could also be detergent so that when added to the first flow, a more concentrated detergent solution and a greater flow volume would result, increasing, momentarily, both cleaning and flushing power of the extractor. This valving arrangement might also be utilized to selectively provide a desired mixed solution, to which, selectively, could be provided an additional constituent, or constituents.

Accordingly, it is an object of the invention to provide a valving arrangement that admixes at least a pair of flows and then selectively introduces at least a third flow to this mixture.

It is an additional object of the invention to provide a pinch valve arrangement that provides mixing of a pair of flows and the selective introduction of at least another flow to the mixture.

It is a further object of the invention to provide a pinch valve arrangement utilizable in an extractor for solution dispensing where a pair of flows such as water and detergent are co-mingled and then an additional flow of detergent is selectively introduced to the solution for spotting and flushing purposes.

It is even a further object of the invention to provide an improved dispensing valve arrangement.

It is also an object of the invention to provide an improved dispensing valve arrangement for use in an extractor.

SUMMARY OF THE INVENTION

The invention comprehends the use of an arrangement having at least three pinchable hoses which are capable of eventually conveying their fluids to a mixing manifold confluent with the three pinchable hoses. Intermediate the three hoses and their mixing manifold, a pinch pin structure is disposed. It takes the form of a spring urged drive linkage mounting a series of pinch pins reciprocally movable with the linkage that engage against the pinchable hoses to deformingly close them. A series of fixed pins on the opposite sides of the pinchable hoses aid in the closing action. The linkage includes a second link connected to a drive link by a lost motion arrangement so as to open and close its respective hose in a sequential manner.

The links move in an opposite direction to their spring urging to open the pinchable hoses, with the drive link being moved linearly by a crank link that may be, manually operated remotely. Under the impetus of this crank link, the drive link immediately moves in a direction to open the first two hoses but the second link is not urged to open its pinch hose until the lost motion, provided by an engaging step in the drive link effectively movingly abuts the second link. Thus, full manifold, mixed solution flow is obtained for dispensing by an admixture of the fluids flowing in the first two hoses before a tertiary flow is introduced to the manifold from the third hose. This, not only will increase the discharge volume, but also may change the constituents of the solution of the dispensed fluid. It also may alter the solution concentration of the dispensed fluid.

The last of these functions lends to the adaptation of this pinch valve arrangement for use in an extractor. If the first two pinch hoses provide a water and detergent flow for normal cleaning, then, selectively, provision of additional detergent flow through the third pinch hose not only increases cleaning power for spot removal but also adds additional flow volume (flushing) to more easily carry off removed dirt from the floor covering being cleaned.

BRIEF DESCRIPTION OF THE DRAWINGS

Reference may now be had to the accompanying Drawings for a better understanding of the invention, both as to its organization and function, with the illustration being only exemplary, and in which.

DETAILED DESCRIPTION OF THE INVENTION

Figure 1:
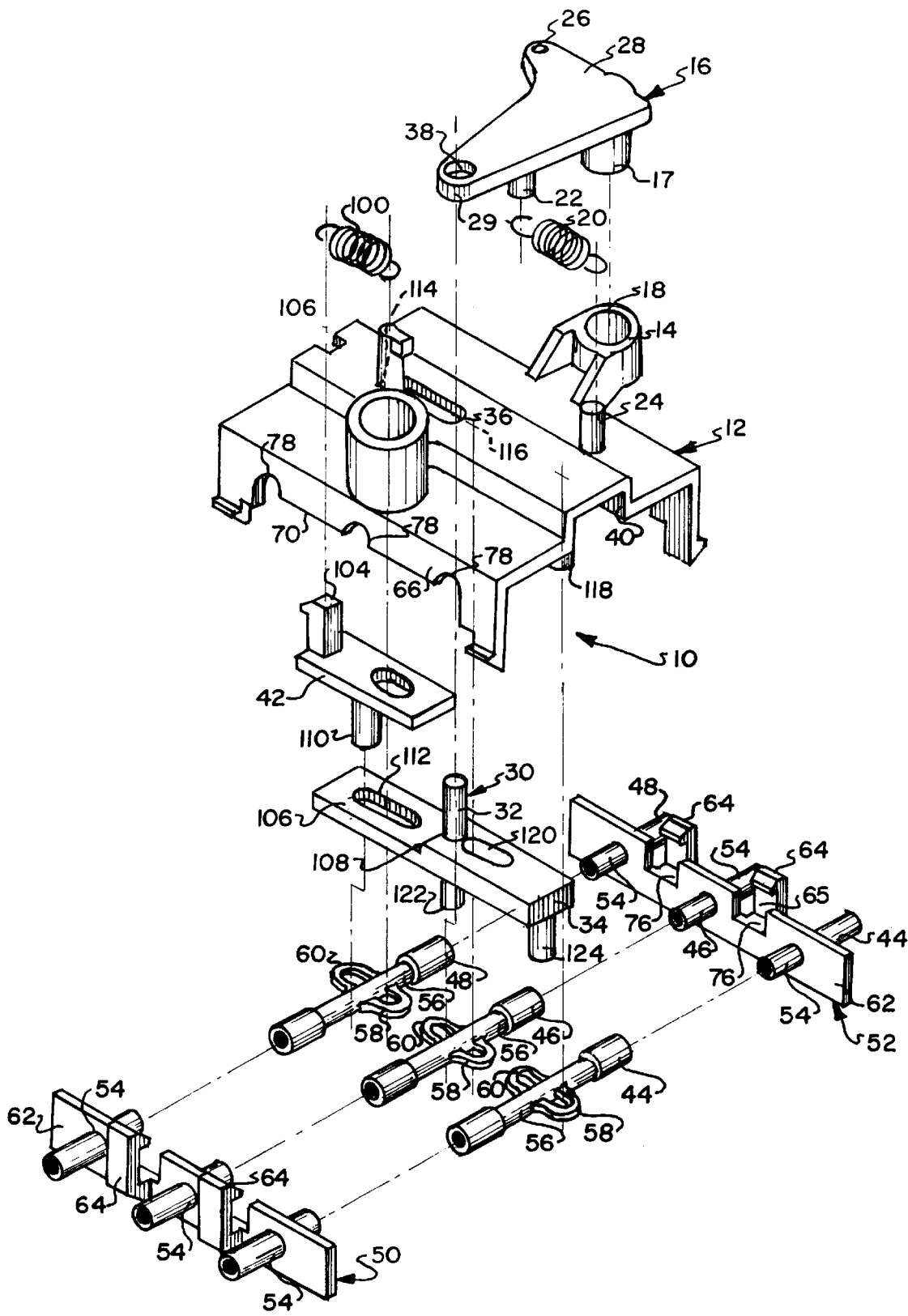
FIG. 1 is an exploded perspective of the inventive valve.
Figure 2:
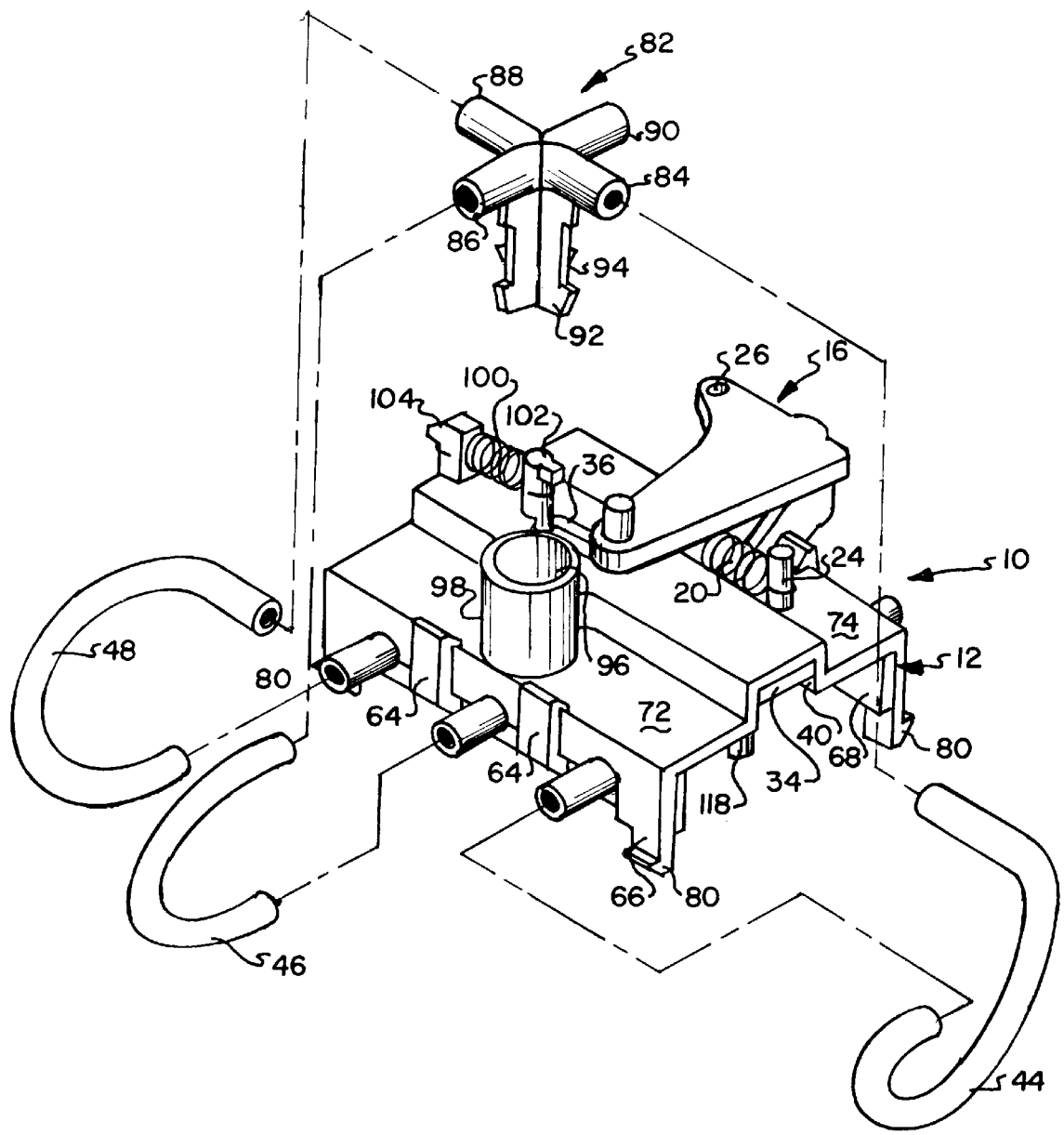
FIG. 2 is an assembled perspective view of this valve with its manifold and connecting hoses shown exploded.

There is shown in FIGS. 1 and 2, all the operating components of a mixing and pinch valve 10 capable of sequential operation. It has a downwardly opening housing portion 12 that either houses or mounts all the operating components. These include a rearwardly disposed upstanding hollow boss 14 that pivotally mounts a crank link 16 by receiving a fixed downwardly depending boss 17, integral with the crank link, within a bore 18 of it. Crank link 16 is continuously urged counterclockwise by a tension spring 20 attached to an integral, downwardly extending, solid boss 22 on the crank link 16. This spring extends between boss 22 and a solid, upwardly extending boss 24, integral with valve housing portion 12.

The crank link 16 is oppositely, operator actuated manually by, e.g., a link or Bowden wire (neither shown) attached to a connecting bore 26 disposed in a rearwardly extending arm 28 of crank link 16. The manual actuation of this crank link forms no part of the invention; however, such a manual actuation arrangement is conventional and old, being shown in exemplary fashion in U.S. Pat. No. 4,575,007, issued Mar. 11, 1986 or in Hoover Application, Case 2367, filed on or about Apr. 5, 1993.

Another arm 29 of the crank link 16 extends forwardly to be attached to a reciprocating pinch linkage 30 disposed within valve housing 12. It includes an upstanding drivable pin 32 integrally mounted on a long link 34 of pinch linkage 30. This link is considered the actuating or drive link of pinch linkage 30 and it is normally urged rightwardly through the aegis of spring driven crank link 16. The drivable pin 32 extends upwardly from long link 30 through, a longitudinally extending through clearance slot 36 in valve housing 12 to attach, pivotally, to the arm 29 of crank link 16. This occurs by the drive pin 32 extending pivotally through a bore 38 in arm 29 of crank link 16. The through slot 36 is made wide enough to accommodate the slight arcuate movement of the pin mounting bore 38 and drivable pin 32.

The valve housing includes an upwardly and outwardly extending portion 40, U-shaped in cross section, disposed medially relative to its front and back and extending from side to side of the housing. This U-shaped portion 40 forms a way or guide portion for the linear reciprocation of the long drive link 34 and an attached second, driven, link 42. The movement and relationship of these two links within the U-shaped portion 40 will be detailed later.

Within bottom portions of the valve housing 12 are disposed a series of three deformable, pinchable hoses 44, 46, 48. These three hoses are situated with their runs transverse to the way, U-shaped portion 40, and are mounted to extend forwardly, through a hose holder 50, and rearwardly, through a hose holder 52. A series of bores 54, 54, 54, 54, 54 and 54 in these two hose holders accommodates their passage therethrough. Each of the pinchable hoses 44, 46 and 48 has a medial stretch 56 of smaller diameter and slightly thinner wall sections than the major hose extent, forwardly and rearwardly, of the medial stretch 56. The medial stretches 56 are so formed as to be more easily deformable to thereby provide the needed "pinch" function to close the wall of the hoses against themselves. At these medial sections of the hoses, are also included, integral pinch pin retaining, elastic, stretchable stirrups 58, 60. These are situated on each side of each medial section 56 to insure retention and limited guidance of their respective pinch pins (to be described later) and to assure full opening of their respective hoses, if pinched for a long time duration.

The hose holders 50 and 52, each, include a wall 62 through which the pinchable hoses 44, 46 and 48 extend, with these walls both mounting a pair of offset lock catches 64, 64 inwardly of their ends. This arrangement forms a slot 65 between the catches 64, 64 and the walls 62, 62. Front and rear walls 66, 68 of the valve housing 12 include a lip 70 at their lower edges (only one shown) which receives the slot 65 telescopically thereover. The lock catches may then engage over flat, front and rear top portions 72, 74 of the valve housing 12, resiliently, with their connecting bottom sections 76, 76 engaging against lip 70. The walls 66, 68 also include semi-circular cutouts 78, 78, 78 (only appearing in wall 66) opening to the lip 70 which accommodate the pinchable hoses 44, 46, 48 in their passage inwardly into the valve housing 12.

Latching catches 80, 80, 80, 80 (only three shown) are also provided on front and rear walls 66, 68 of valve housing 12 to conveniently connect it to any desired provided base member (not shown). This yields an easily mounted valve, with the housing of the valve, cup like downwardly, to effectively shield the valve's major moving parts.

The pinchable hoses 44, 46 and 48, forwardly of the valve housing 12 (FIG. 2), are bent upwardly so as to be conveniently confluently connected (shown fragmentarily) to a flow manifold 82 having the shape, in plan view, of a cross, with tubular intakes 84, 86 and 88 connected, respectively, to pinchable hoses 44, 46 and 48. The fluid flows of the three pinchable hoses 44, 46 and 48 are merged within flow manifold 82 and discharged through a fourth leg of the cross shape comprising a tubular outlet 90. Since valve 10 operates sequentially, a desired total flow of the mixture of the first two hoses or a mixture, with the addition of a flow from the third hose, is confluently distributed from tubular outlet 90. This tubular outlet, for example, could be connected to a spray nozzle or the like to provide a desired cleaning solution discharge to a floor covering material undergoing cleaning.

Flow manifold 82 is conveniently mounted on valve housing 12 by a downwardly depending mounting stem 92 integral with it. This mounting stem may include one way arcuately arrayed, locking barbs 94, so that, upon insertion of mounting stem 92 within a bore 96 of a hollow upstanding boss 98 of valve housing 12, it is positively located and fixed. Boss 98 may be made integral with the remainder of valve housing 12.

The second link 42 of pinch linkage 30, like drive link 34, is also resiliently urged rightwardly by a tension spring 100. This spring has its inner end connected to a fixed post 102, extending upwardly from U-shaped way portion 40 of valve housing 12, and its outer end connected to an integral post 104 extending upwardly from the leftward end of the second link 42 so as to stretch therebetween. A rectangular notch 106 in the leftward side edge of valve housing 12 permits passage of the second link fixed post 104 upwardly through the valve housing 12 for easy connection to the tension spring 100.

It should now be clear that both the long, drive link 34 and the shorter, second link 42 are spring urged rightwardly (FIG. 3) within the U-shaped way 40 (by springs 20 and 100). These links, additionally, act in concert in other parts of their functioning. They are mounted in a partial overlying tandem relationship (FIGS. 3–5), with the second link 42 disposed over and on a stepped portion 106 of the long link 34. A rightward termination wall 108 of the stepped portion 106 of drive link 34 provides an abutment which function to drive the second link 42 leftwardly as the long link 32 moves leftwardly during the operation of the pinch valve 10. The second link 42 also includes a movable pinch pin 110 for hose 48, mounted on its bottom side, which is movable, as the drive and second links move relative to each other, in a long, clearance slot 112 in stepped portion 106 of drive link 34.

The long, clearance slot 112 also provides passage for a fixed pinch pin 114 for hose 48. It is fairly long to accommodate the relatively longer length of travel of the link, drive 34 relative to the length of travel of the second link 42 during the opening and closing functioning of valve 10. The pinch pin 114 is integral with the valve housing 12 (FIG. 1) and depends downwardly from its undersurface and is, in reality, an extension of fixed post 102, utilized to anchor spring 100.

Figure 3:
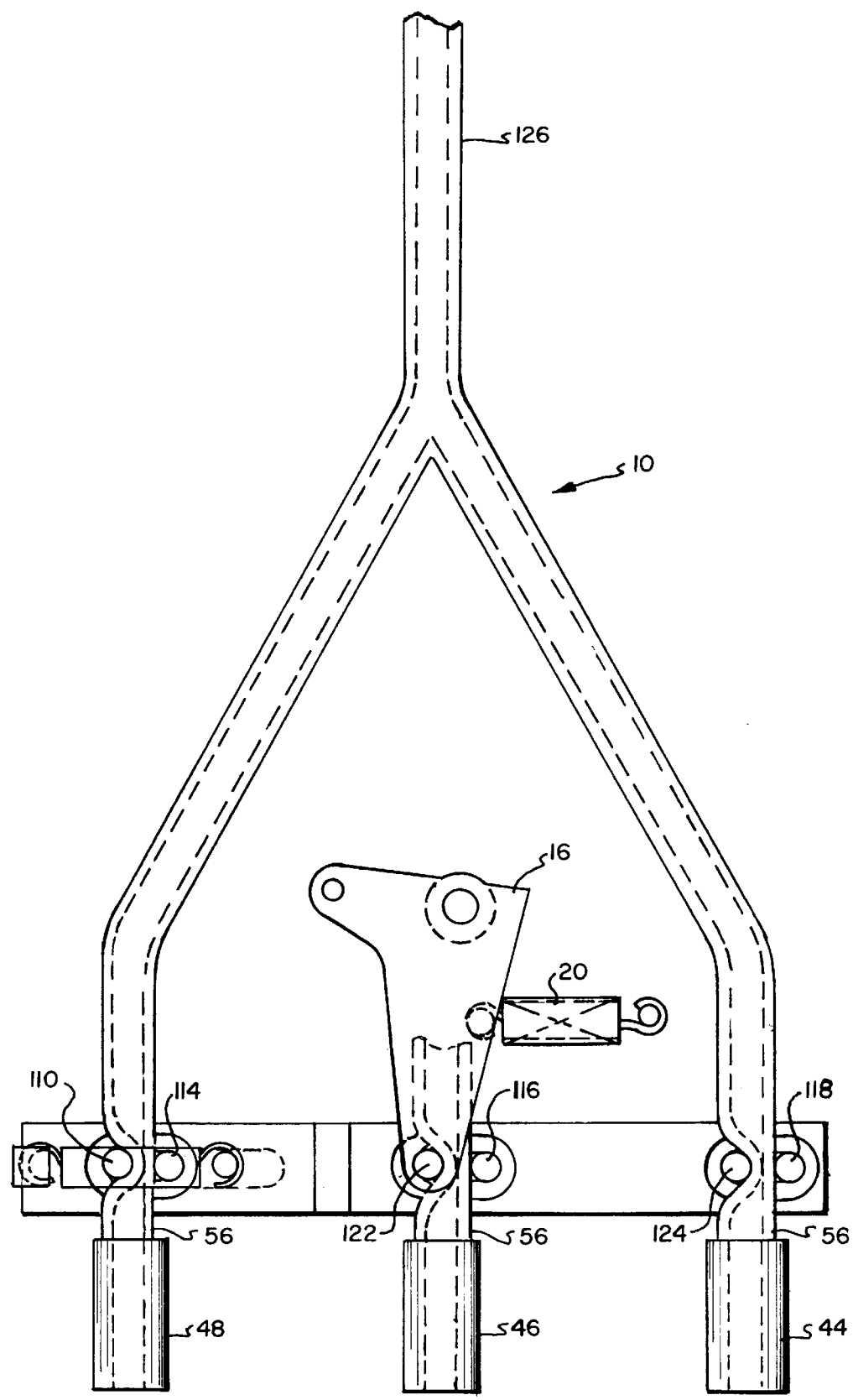
FIG. 3 is a fragmentary plan view of the major operating parts of the pinch valve and hose arrangement and showing all the hoses closed.
Figure 4:
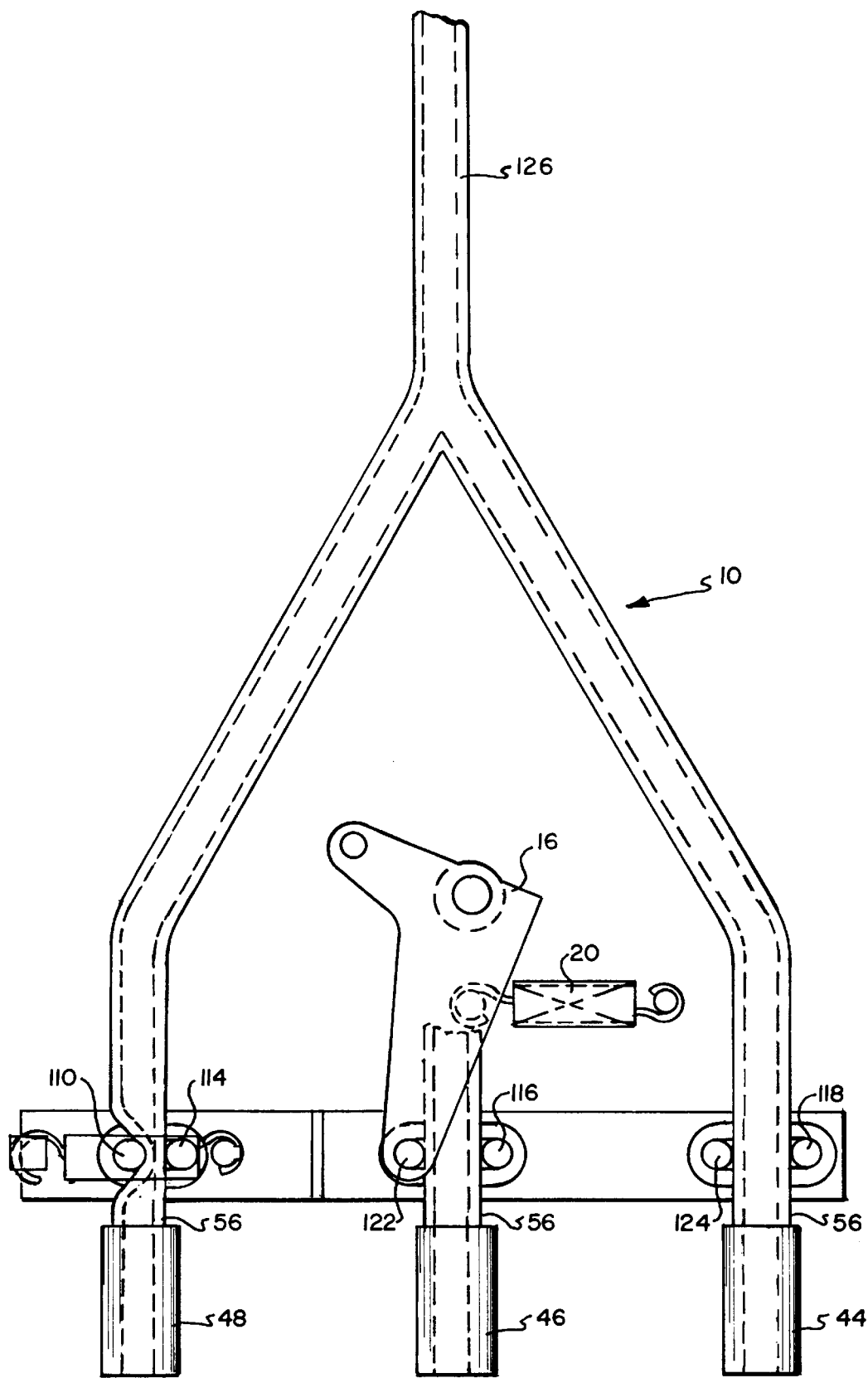
FIG. 4 is a similar showing to that of FIG. 3 but showing the third and most leftward hose closed while the first and second hoses are in open condition.
Figure 5:
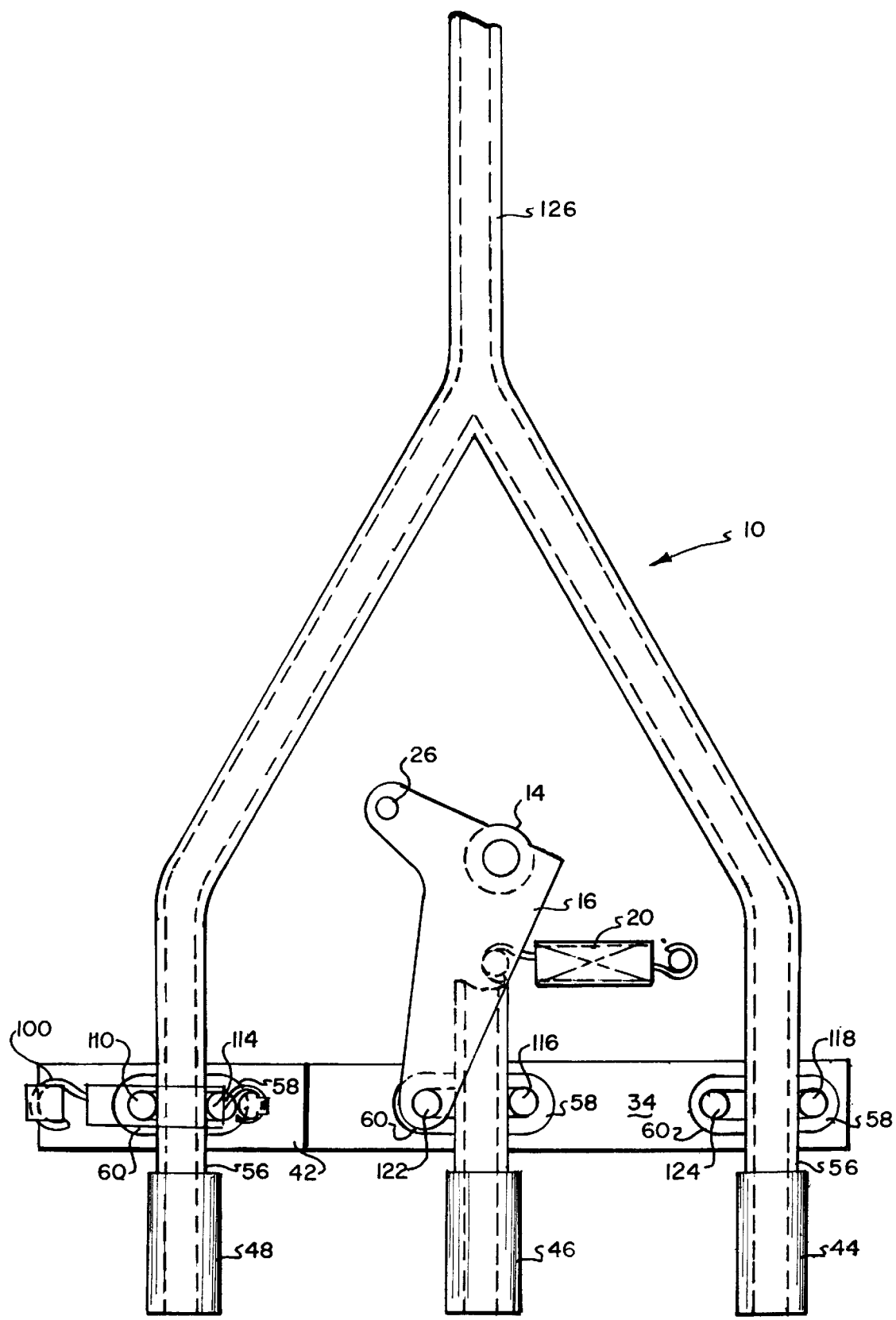
FIG. 5 is a similar fragmentary plan view to that FIGS. 3 and 4 but showing all the hoses open.

Integral fixed pinch pins 116, 118 also extend downwardly from the undersurface of valve housing 12, with the fixed pinch pin 116 also passing through drive link 34 by way of a rightward, clearance slot 120, disposed in it. The depending relationship of these three fixed pins with the valve housing 12 can most clearly be discerned by the full line showing of pinch pin 118 in FIGS. 1 and 2. All three, uniformly, integrally depend downwardly from the bottom side of the valve housing 12 to be positioned to engage their respective pinchable hoses 44, 46, 48 (FIGS. 3 to 5).

The movable pin 110, already described, serves as the pinch pin for the pinch valve 10 that provides sequencing operation. It, along with a pair of simultaneously acting movable pinch pins 122 and 124, act against fixed pinch pins 114, 116 and 118, respectively, to close or open flow through the pinchable hoses 44, 46, 48, respectively. Pinch pins 122, 124 are carried integrally by the long link 34 and extend downwardly from its bottom surface to move reciprocatorily in the most rightward two stretchable stirrups 60, 60 of medial stretches 56, 56 of hoses 44, 46, respectively. Movable pinch pin 110, carried by second link 42, reciprocates in the most leftward stirrup 60 of the hose 48. These three pins, at their rightward extreme of movement (FIG. 3) close off the pinchable hoses 44, 46 and 48 by deforming their cylindrical walls since these hoses are pinched between them and the fixed pins 114, 116 and 118, each of which are disposed in a respective stirrup 58.

The operation of the pinch, sequencing valve 10 should now be clear by specific referring again to FIGS. 3–5. It can be seen in FIG. 3 that all of the movable pinch pins 110, 122 and 124 are engaged with their collapsed pinchable hoses. This is because the crank link 16 is at its most counterclockwise position and has not been moved clockwise by the operator of the pinch valve 10. The tension springs 20 and 10, then, have moved the crank link 16 and directly connected drive link 32 and the second link 42 rightwardly to carry their moving pinch pins 124, 122 and 110 deformingly against the hoses 44, 46 and 48, respectively.

Operator urging of the crank link 16 against the force of the tension spring 20, in a clockwise direction initially moves the long link leftwardly, slowly opening pinchable hoses 44 and 46 to, finally, their fully open state. But the second link remains stationary because of the tensile pull of its tension spring 110 and because the termination wall 108 of long link 34 has only shifted leftwardly enough to, abuttingly, lightly contact the second link 42 but has not yet driven it leftwardly (FIG. 4).

Further clockwise swinging of crank 16 forces long drive link 34, through termination wall 108, to drive second link 42 leftwardly to open the third and final hose 48 (FIG. 5). At this position of the first link 34, the most rightward two stirrups 60, 60 are stretched. This will tend to slightly deform their respective hoses 44, 46 (not shown for ease in illustration) but the hoses 44, 46, functionally, for all intents and purposes, remain in their open position.

Although the valve 10 could find specific general application in the sequential admixture of three partly of wholly dissimilar fluids, it has been found to have a very desirable use in an extractor as an extractor valve where pinchable hoses 44 and 48 are branches of a cleaning detergent main line 126 and the hose 46 contains water. In this arrangement, a combined water and detergent mix of more and more volume can be applied to a rug or the like and then an additional detergent concentration can be provided with an even higher flow rate, advantageous, for flushing.

It should now be clear that all the advantages set out as attendant to this invention have been provided. It should also be apparent that many changes and alterations could be made to the described invention which would still be within its spirit and purview.

What is claimed is:

1. A pinch valve arrangement for use with at least two pinchable hoses, said valve comprising:

a) at least two fixed pinch pins, one disposed on a first side of each pinchable hose;

b) at least two movable pinch pins, one disposed on second opposing side of each said pinchable hose; and c) a linkage arrangement carrying said movable pinch pins, said linkage arrangement comprising a drive link having at least one of said at least two movable pinch pins extending therefrom and a driven link having at least one of a remaining of said at least two movable pinch pins extending therefrom;

d) said drive link and said driven link both being biased to a hose closed position in which said at least two movable pinch pins pinch and close said at least two pinchable hoses;

e) said driven link being movable relative said drive link, whereby actuation of said drive link by an operator moves said drive link through a first range of motion to a hose open position in which said at least one movable pinch pin is moved away from a corresponding at least one hose of said at least two hoses to open said at least one hose, while said driven link remains in said hose closed position; and f) said drive link includes an engaging portion that, after movement of said drive link through said first range of motion, abuts against said driven link, whereby upon continued actuation of said drive link by an operator said drive link moves through a second range of motion in which said engaging portion drives said driven link to a hose open position in which said at least one remaining movable pinch pins is moved away from a corresponding at least one of a remaining hose of said at least two hoses to open said at least one remaining hose.

2. A pinch valve arrangement according to claim 1, further comprising a pivotally swinging crank link drivingly connected to said drive link to drive said drive link through said first and second ranges of motion.

3. A pinch valve arrangement according to claim 2, wherein said drive link and said driven link move rectilinearly.

4. A pinch valve arrangement according to claim 3, further comprising a valve housing and wherein:

a) said fixed pins extend from said valve housing; and b) said drive link and said driven link slidably engage said housing.

5. A pinch valve arrangement according to claim 4, wherein said crank link is pivotally mounted to said valve housing.

6. A pinch valve arrangement according to claim 4, further comprising a clearance slot in at least one of said drive link and said driven link, wherein at least one of said fixed pinch pins passes through said at least one clearance slot and extends beyond said at least one link into position alongside at least one of said hoses.

7. A pinch valve arrangement according to claim 1, comprising at least said three said pinchable hoses, at least three said fixed pinch pins, and at least three said movable pinch pins; and wherein at least two of said at least three movable pinch pins extend from said drive link and a remainder of said at least three movable pinch pins extend from said driven link.

8. A pinch valve arrangement according to claim 7, wherein:

a) said at least three hoses have an upstream end and a downstream end, said downstream end of said at least three are being connected to mixing manifold;

b) said upstream end of a first of said at least three hoses is connected to a water supply reservoir;

c) said upstream ends of a second and a third of said at least three hoses are connected to a detergent supply reservoir;

d) said first and second hoses are pinched and closed by said at least two movable pinch pins; and e) said third hose is pinched and closed by a said remainder movable pinch pin.

9. A pinch valve for providing a variable mixture of water and detergent, said valve comprising:

a) three pinchable hoses having upstream ends and downstream ends, said downstream ends of all three said hoses being connected to a mixing manifold;

b) a source of water, said upstream end of a first of said three hoses being connected to said source of water to covey water to said mixing manifold;

c) a source of detergent, said upstream ends of a second and a third of said three hoses being connected to said source of detergent to convey detergent to said mixing manifold;

d) three fixed pinch pins, one disposed adjacent to each said hose and three movable pinch pins disposed adjacent to each said hose, opposite said fixed pinch pins, to selectively pinch and close each said hose;

e) a drive link having a first and a second of said movable pinch pins extending therefrom to selectively pinch and close said first and second hoses;

f) a driven link having a third of said movable pinch pins extending therefrom to selectively pinch and close said third hose;

g) said drive link and said driven link both being biased to a hose closed position in which said three movable pinch pins pinch and close said three hoses;

h) said driven link being movably mounted relative said drive link, whereby actuation of said drive link by an operator moves said drive link through a first range of motion to a hose open position in which said first and second movable pinch pins are moved away from said first and second hoses to open said first and second hoses, while said driven link remains in said hose closed position; and f) said drive link includes an engaging portion that, after movement of said drive link through said first range of motion, abuts against said driven link, whereby upon continued actuation of said drive link by an operator said drive links moves through a second range of motion in which said engaging portion drives said driven link to a hose open position in which said third movable pinch pin is moved away from said third hose to open said third hose.

10. A valve according to claim 9, further comprising a pivotal crank link drivingly connected to said drive link to drive said drive link through said first and second ranges of motion.

11. A valve according to claim 10, wherein said drive link and said driven link move rectilinearly.

12. A pinch valve arrangement according to claim 10, further comprising a valve housing and wherein:

a) said fixed pins extend from said valve housing; and b) said drive link and said driven link slidably engage said housing.

13. A pinch valve arrangement according to claim 12, wherein said crank link is pivotally mounted to said valve housing.

14. A pinch valve arrangement according to claim 12, further comprising a clearance slot in at least one of said drive link and said driven link, wherein at least one of said fixed pinch pins passes through said at least one clearance slot and extends beyond said at least one link into position alongside at least one of said hoses.

* * * * *